United States Patent

[11] 3,539,056

| [72] | Inventor | Alain Edouard Plegat<br>Asnieres, France |
|---|---|---|
| [21] | Appl. No. | 774,412 |
| [22] | Filed | Nov. 8, 1968 |
| [45] | Patented | Nov. 10, 1970 |
| [73] | Assignee | Societe Anonyme Des Usines Chausson<br>Asnieres (Hauts de Seine), France<br>a company of France |
| [32] | Priority | Nov. 24, 1967 |
| [33] | | France |
| [31] | | 129,540 |

[54] MACHINE FOR PILING IN A STORAGE PLACE RADIATOR FINS WHICH HAVE JUST BEEN SHAPED
6 Claims, 3 Drawing Figs.

[52] U.S. Cl. .................................. 214/7,
198/24
[51] Int. Cl. ............................................. B65g 57/00
[50] Field of Search ....................................... 214/7, 6(K),
6(P), 6(D); 198/24, 31(A2)

[56] References Cited
UNITED STATES PATENTS

| 2,234,990 | 3/1941 | Todhunter .................... | 198/24 |
| 2,470,795 | 5/1949 | Socke .......................... | 198/24(X) |
| 2,651,896 | 9/1953 | Woodruff et al. ............. | 214/7UX |
| 2,768,756 | 10/1956 | Horman ....................... | 198/24X |
| 2,934,221 | 4/1960 | Tonna .......................... | 214/6 |

Primary Examiner—Gerald M. Forlenza
Assistant Examiner—Robert J. Spar
Attorney—Imirie, Smiley, Snyder & Butrum ABSTRACT: The machine for piling radiator fins which have just been shaped comprises on a storing plate an alternating movement push plate driven by a double-acting pneumatic jack and placed parallel to the trajectory of a fin ejected from the shaping device. A damping device, comprising a stop plate carried by a guide checked by a friction part and aligned with the rod of a second double-acting pneumatic jack, is placed perpendicularly to the push plate on the trajectory of the fin. Said two jacks are supplied in a time relation with compressed air by valves operated by two cams which are themselves driven by a transmission connected to the shaping device and choked on the same shaft.

Patented Nov. 10, 1970

INVENTOR
ALAIN E. PLEGAT

Patented Nov. 10, 1970

INVENTOR

ALAIN E. PLEGAT

Mueie & Smiley
ATTYS.

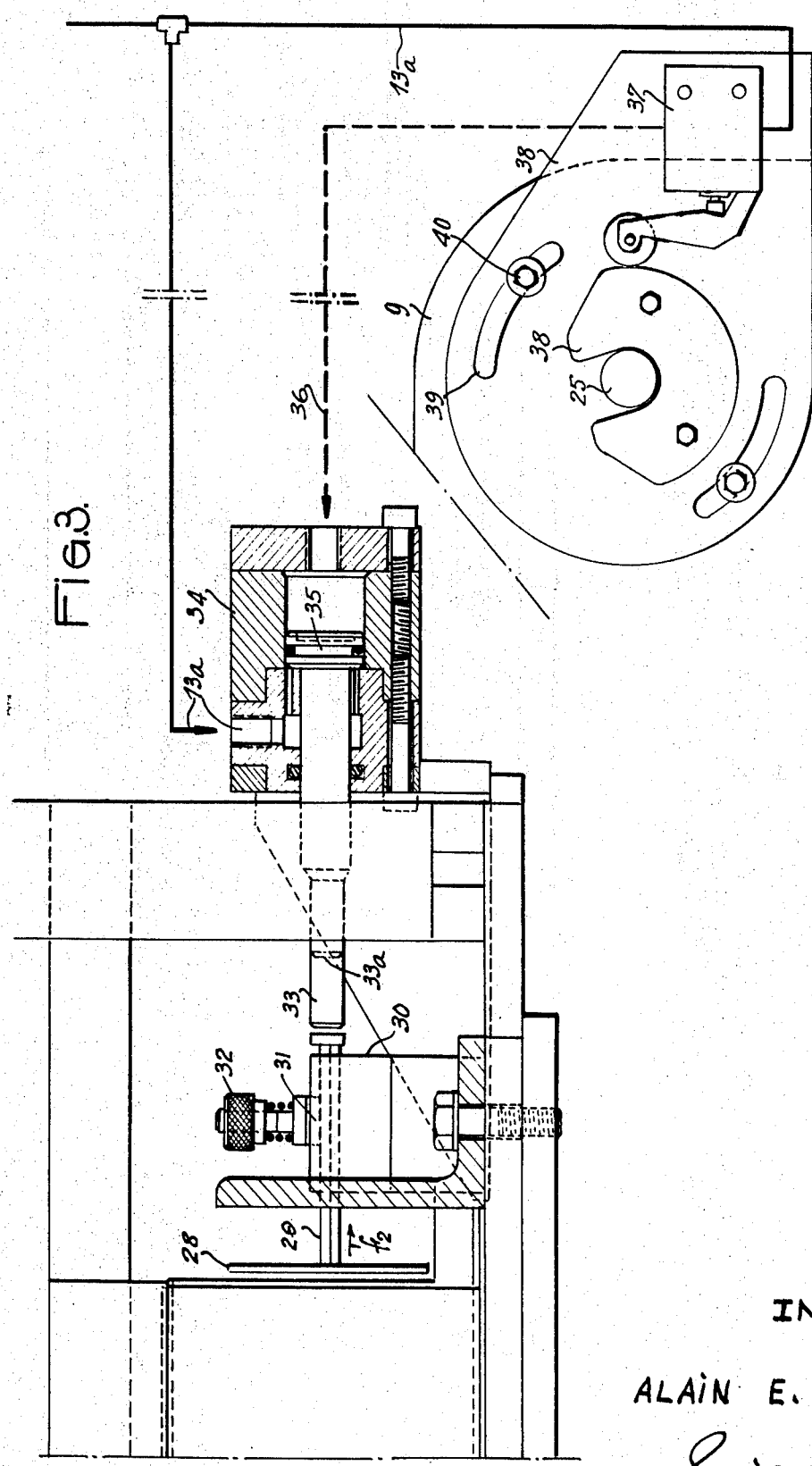

3,539,056

MACHINE FOR PILING IN A STORAGE PLACE RADIATOR FINS WHICH HAVE JUST BEEN SHAPED

The present invention relates to a machine most particularly used in the industry for making cooling radiators for vehicles, of the fin type, this machine being intended to receive the fins which have just been shaped in a shaping device, specifically a press, and which must then be piled one behind the other in a storage place, from which said fins are then taken for conveying to the machines which actually make the radiator, specifically to machines acting for engaging the tubes in the perforations of the fins.

The improvements of the present technique of stamping and shaping make it possible to produce fins at very high speed from continuous metal strips moving forward at the rate of several tens of meters per minute. These improvements have posed a problem that is difficult to solve with regard to receiving finished fins at the exit from devices effecting their shaping. Actually, the fins are ejected from these devices at high speed in an axial direction, and it is then necessary that said fins be piled one behind the other, i.e., that they are submitted to a movement staggered by 90° in relation to that in which they are conveyed during their ejection from the shaping device.

It has quickly appeared that the devices used up till now were incapable of solving this problem, for the ejection speed of the fins is such that they rebound and are distorted when they strike against a fixed wall intended to stop their ejection movement and, consequently, this results in numerous fins being rejected, and that moreover, even those that are not distracted successive fins are no longer aligned for being properly introduced into a storage place in which they must necessarily remain resting on the edge of their large side so that they can be directly positioned in chargers which are themselves used for the supply of the machines then engaging the tubes in the perforations of the fins.

Furthermore, owing to the high manufacturing rate, it has appeared that it was necessary to devise a device rigorously synchronized with the shaping device for introducing the fins successively ejected into their storage place. Now, up till now, mechanical synchronizing devices require the existence of a certain time constant between the moment when they act and the one when they are driven, so that they no longer meet present requirements. Moreover, according to the tools that are used in shaping devices, the fins that are ejected from them do not always have the same size, and their mass varies, so that this still further complicates the problem.

The invention completely solves this problem by creating a new machine for piling radiator fins which have just been shaped.

According to the invention, the machine comprises on a plate, forming the storing place, an alternating movement push plate driven by a double-acting pneumatic jack and placed parallel to the trajectory of a fin that has just been shaped which is ejected from the shaping device, a damping device, comprising a stop plate carried by a guide checked by a friction part and aligned with the rod of a second double-acting pneumatic jack, being placed perpendicularly to the push plate on the trajectory of the fin that has just been ejected and said two jacks are supplied in a time relation with compressed air by valves operated by two cams which are themselves driven by a transmission connected to the shaping device for fins.

Various other characteristics of the invention will moreover be revealed by the detailed description which follows.

A form of embodiment of the purpose of the invention is shown, by way of nonrestrictive example, in the attached drawing.

FIG. 3 is an elevation section, partly diagrammatical, seen along the line III–III of FIG. 1.

Figure 1:
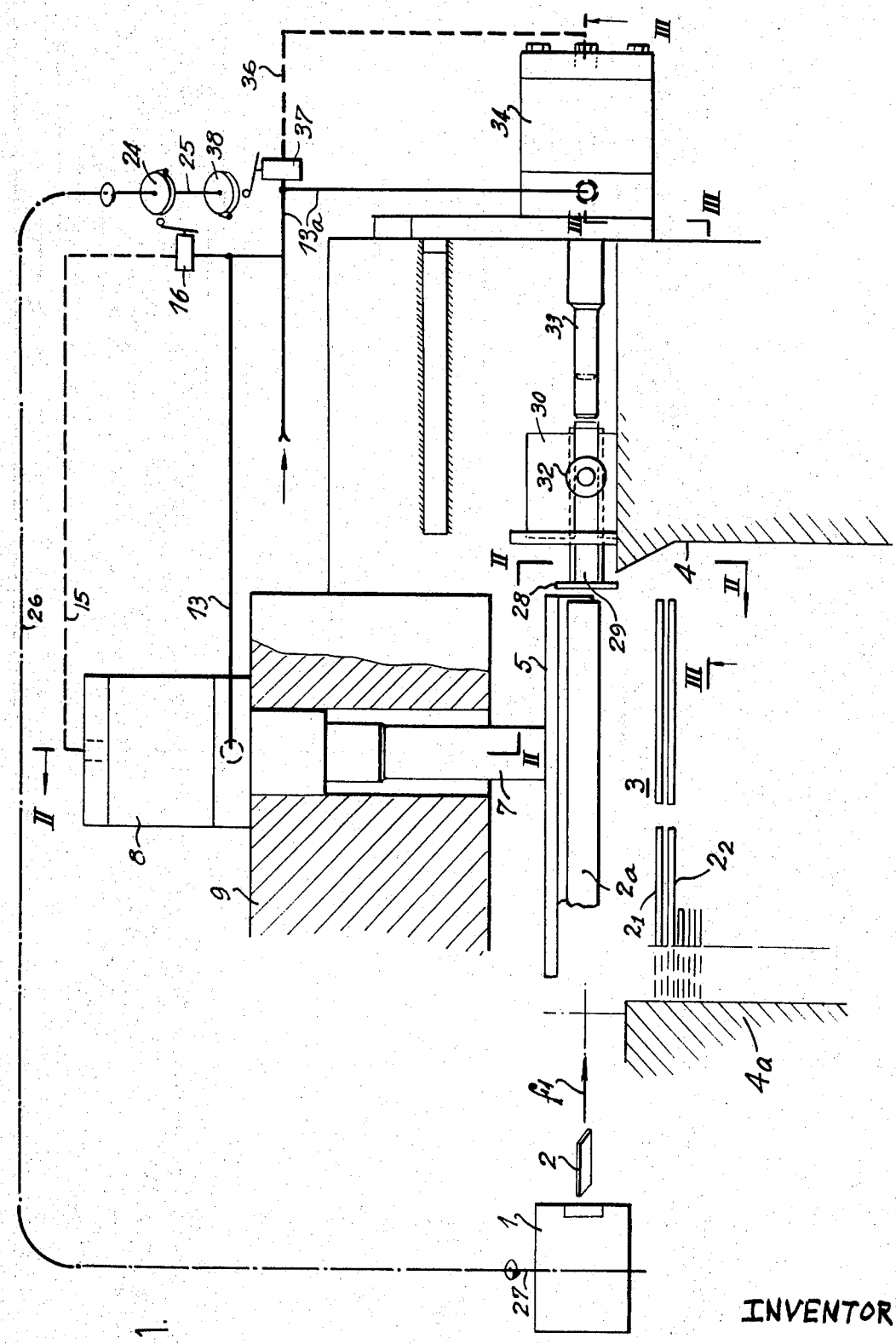
FIG. 1 is a diagrammatical plan showing the machine for piling fins according to the invention.

In FIG. 1, 1 designates an assembly for shaping and cutting fins to length for a radiator, this assembly being, for instance, made of a high-speed press which shapes, from a continuous trip conveyed to it, the various stamping and cuts required from producing said fins by means of a suitable tool which preferably also cuts the shaped fins. The device 1 also comprises means (not shown, as they do not form part of the invention), which have the effect of ejecting the shaped and cut fins, such as the fin 2, in the direction of the arrow $f_1$, this being shown outside of the scale so as not to encumber the drawing.

The device 1 shapes the fins at high speed. For piling the fins on their edge in a storage place defined by a bottom plate 3 and opposite side walls 4, 4a, there is used, as shown in both FIGS. 1 and 2, a push place 5 carried by a traveller 6 which is fixed to the end of the rod 7 of a jack 8 carried by a frame 9. The storage place is not part of the invention and may be formed for instance as taught in any of French Pat. Nos. 1,236,578; 1,037,716; or 1,106,736, i.e., in the shape of a channel having a bottom and lateral sides wherein the fins are stacked one against the other as illustrated by fins $2_1$, $2_3$, in FIGS. 1 and 2 of the drawings of the present application.

Figure 2:
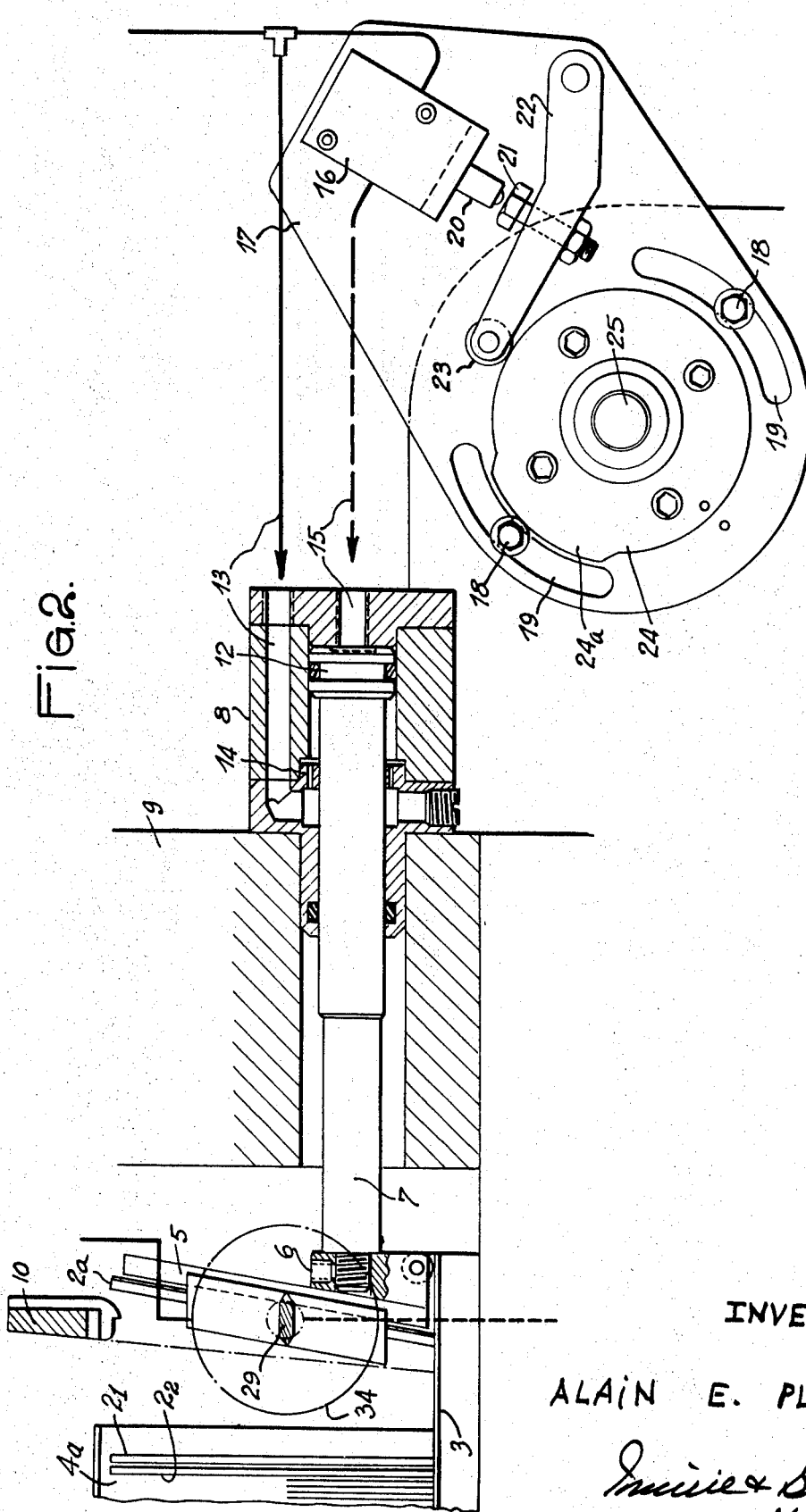
FIG. 2 is an elevation section, partly diagrammatical, on a larger scale, III–along the line II–II of FIG. 1.

FIG. 2 shows that each fin made, designated by 2a in this FIG., bears against the push plate 5 when it is ejected from the device 1 and each fin thus brought against the plate 5 is retained by one or more movable clips 10. The jack 8 which is intended to actuate the push plate 5 in an alternating movement which must be synchronized with the shaping and ejection device 1, is of the double-action pneumatic drive type. The chamber comprised by the jack 8 on the front of the piston 12 with which it is provided, is supplied in a continuous manner with constant compressed air, through channels 13 and inlet ducts 14. On the other hand, the bottom chamber to the piston 12 is supplied with compressed air conveyed in a discontinuous manner through piping 15. For deciding the moments when the actuating compressed air must be brought through the piping 15, a valve 16 is provided on a plate 17 connected to the frame 9 of the machine by locking screws 18 passed through curved slots 19 of said plate. The valve 16 comprises an actuating finger 20 which is operated by a stop 21 of a pivoting lever 22 whose free end comprises a roller 23 for rolling on a cam 24 driven by a shaft 25. FIG. 1 shows that the shaft 25 is kinematically connected, by means of a transmission 26, to a shaft 27 or other suitable mechanical member controlling or driven by the device 1 shaping and cutting the fins.

As explained in the foregoing, as the making of fins takes place at a rapid rate and these fins being ejected from the device 1 for being projected in front of the push plate 5, it is essential to be able to synchronize in a very accurate manner, the working of the jack 8, whilst allowing for the time taken by each fin for traveling the distance separating the device 1 from the push plate 5. This lapse of time can, moreover, be varied according to the length of the fins and also their weight, likewise as a function of the working rate of the device 1.

It has been found advantageous to be able to regulate the precise moment when the jack rod 7 displaces the push plate 5 while the machine is working. This result is obtained, seeing that the cam 24 is permanently driven at a speed which is a direct function of the working speed of the device 1, the regulating of the precise moment when the jack is supplied with air through the piping 15 depending on the position taken by the valve 16 in relation to said cam 24, this position being adjustable by causing the plate 17 to pivot more or less in relation to the frame 9 which is made possible by the existence of the curved slots 19.

As shown in FIG. 2, when the valve 16 is actuated by the active part 24a of the cam 24, compressed air is conveyed behind the piston 12, and hence, the rod 7 is displaced for simultaneously driving the push plate 5 and fin 2a which is thus taken past the movable stop clip 10.

During this displacement movement of the piston 12, the air in the front chamber is slightly compressed and the ducts 14 being of small section, a damping action is thus produced which prevents the eventual rebounding of the piston 12 at the end of its stroke. As soon as the active part 24a of the cam 24 no longer acts on the valve 16, the air intake is stopped behind the piston 12, so that the compressed air, continuously conveyed through the ducts 13, returns the piston 12, and hence, the push plate 5 to their initial position.

In the foregoing, it has been explained that the fins 2 that have just been shaped and cut were ejected, so as to be brought in front of the push plate 5, seeing that the machine operates at high speed, the ejection speed is great and it is obviously imperative that each fin is brought in front of the push plate 5 in a correct position. To this end, as shown in FIGS. 1 and 3, there is placed facing the device 1 and on the extreme lateral side of the push plate 5, a damper plate 28 mounted on a guide 29 sliding in a slide 30 and on which a friction part 31 bears that can be more or less tightened by a nut 32.

The guide 29 is placed extending the rod 33 of a jack 34 made in a similar way to the jack 8 described in the foregoing, i.e., that this pneumatic drive double-acting type jack comprises a piston 35 confining, in the body of the jack, a front chamber continuously supplied with air under pressure by ducts 13a which are connected to the supply duct 13 of said jack 8. The jack 34 also confines a chamber positioned after the piston 35 and this chamber is cyclically supplied with air under pressure through a duct 36 coming from a valve 37 similar to the valve 16 and itself supplied by the ducts 13a. The valve 37 is actuated by a cam 38 driven by the shaft 25 described in the foregoing, and although this is not necessary in all cases, it is however advantageous that the valve 37 is mounted on a plate 38 with curved slots 39 through which locking screws 40 pass connecting it to the frame 9 so that the valve 37 can be angularly displaced in relation to the cam 38 even while the machine is running.

The jamming of the valve 37 is so arranged that the jack rod 33 is in its maximum withdrawn position, i.e., that its end is placed at 33a, as shown in FIG. 3, when a fin is ejected by the device 1. This fin then strikes against the plate 28 which is moved in the direction of the arrow $f_2$, consequently ensuring the damping of the movement of the fin because the guide 29 is checked by the friction part 31. In addition to obtaining, by this means, a stopping of the fin in a suitable position in relation to the push plate 6, this also avoids risks of distorting the fin, as would occur if said fin struck against a rigid wall, and this also avoids any risk of the fin rebounding.

When the jack 8 has made its work cycle and the push plate 5 is brought back to its waiting position, but before a fin is freshly ejected from the device 1, the valve 37 operated by the cam 38 sends air under pressure into the rear chamber of the jack 34 so that the rod 33 brings the plate 28 to the position shown in the drawing. The machine is thus ready to make a new work cycle.

The invention is not restricted to the example of embodiment shown and described in detail, for various modifications can be applied to it without going outside its scope. In particular, one and the same machine can comprise several tiers of assemblies such as those described in the foregoing, when the device for shaping fins itself comprises several superimposed stages of shaping tools.

I claim:

1. Machine for piling radiator fins which have just been shaped, characterized in that it comprises a plate and sidewalls defining a storage place, an alternating movement push plate driven by a double-acting pneumatic jack and placed parallel to the trajectory of a fin that has just been shaped which is ejected from the shaping device, said push plate being located adjacent said storage place, a damping device, comprising a stop plate carried by a guide checked by a friction part and aligned with the rod of a second double-acting pneumatic jack, said damping device being placed perpendicularly to the push plate on the trajectory of the fin that has just been ejected to be placed against said push plate and said two jacks are supplied in a time relation with compressed air by valves operated by two cams which are themselves driven by a transmission connected to the shaping device for fins.

2. Machine according to claim 1, characterized in that the cams actuating the control valves of the jacks are choked on the same shaft and at least the valve for actuating the jack connected to the push plate for the fins is mounted on a plate angularly movable in relation to the cam controlling it, so that the actuating moment of the jack can be regulated while the machine is running.

3. Machine according to claim 1, characterized in that the valves controlling the two jacks are mounted in a similar manner on movable plates.

4. Machine according to claim 1, characterized in that a friction part with adjustable pressure is associated with a guide of the stop plate for regulating the damping of the fins as a function of their ejection speed and weight.

5. Machine according to claim 1, characterized in that the pneumatic jacks, the one operating the push plate, the other, the returning of the stop plate, are made in a similar manner and are permanently supplied on the front face of the piston with compressed air through small-section ducts so that this air is supercharged during the active stroke of said jacks and thus causing a damping effect at the end of stroke and avoiding any rebounding.

6. Machine according to claim 1, characterized in that the thrust plate is arranged at the entry to a storing place and at least one movable clip is placed in front of this thrust plate, slightly above it, for holding the fins successively brought in front of the thrust plate in a nearly vertical position before they are introduced into the storage place.